United States Patent Office.

MAX HIRSCH, OF RADEBERG, GERMANY.

MEANS FOR DECOLORING GLASS.

SPECIFICATION forming part of Letters Patent No. 576,312, dated February 2, 1897.

Application filed October 8, 1895. Serial No. 565,047. (No specimens.) Patented in Germany January 13, 1895, No. 88,615, and in England September 25, 1895, No. 17,931.

*To all whom it may concern:*

Be it known that I, MAX HIRSCH, of Radeberg, in the Kingdom of Saxony, German Empire, have invented certain new and useful Improvements in Means for Decoloring Glass, (and which have been patented in the Empire of Germany by Patent No. 88,615, dated January 13, 1895, and in Great Britain by Patent No. 17,931, dated September 25, 1895,) of which the following is a specification.

For decoloring glass while in a molten state metals or metal compounds have been used, such, for instance, as antimony, nickel, zinc, lead, or the oxids of such metals. Furthermore, acids have been used, such as arsenious acid, also minerals, such as pyrolusite or manganese, and salts, such as saltpeter; but I am not aware that selenium has ever been made use of for decoloring glass while in a molten state.

My invention consists in the use of selenium or selenium compounds, such as selenite or selenate, for the above-mentioned purpose.

I am well aware that selenium or selenium compounds have been proposed as means for coloring glass, and I refer to the publication of T. Pelouze in the *Comptes Rendus*, Vol. LXI, page 615, October, 1865, and of the German Patents Nos. 63,558, 73,348, 74,565, and 77,737. In all these publications it is set forth that selenium may be used for coloring glass either rose-red or orange color, but in no instance is reference made to the use of selenium or selenium compounds for decoloring purposes. Now in view of the fact that not every known means for coloring glass is *per se* means for decoloring glass, and, furthermore, that not every known means for decoloring glass will be suitable for coloring glass, my invention is based on the discovery which I have made that selenium is in a very high degree suitable for the decoloring of glass. I have found by repeated experiments that by adding a very small quantity of selenium to the molten glass I may convert the glass of a dark shade into a white and bright glass of very fine appearance. The less dull the molten glass, especially if materials of a better class have been used for its components or ingredients, the smaller may be the quantity of selenium for decoloring the same and for obtaining white glass. Again, glass molten with potash will require a smaller addition of selenium than glass molten with soda or Glauber salt. I have found by experiments that with a quantity of glass for which one hundred kilograms of sand and the necessary quantity of flux have been used about one to five grams of selenium may be used for decoloring the glass.

Experiments have proved that the same composition of molten glass for the decoloring of which nickel has hitherto been used will deliver a much whiter glass if selenium be used for decoloring. The selenium may be used as metallic selenium or as a selenium compound or composition or in the form of a gas. It may be used as a selenite, that is to say, a salt composed of selenious acid and an alkali, or as a selenate, that is to say, a salt composed of selenic acid and an alkali. The selenite or selenate may be added to the dry glass frit or may be added to the molten glass and well stirred thereinto. When such a compound is used, suitable agents for setting free the selenium in the glass must be employed. These agents may be such as are well known for the freeing of the selenium from the selenite or selenate in the art of coloring glass with selenium; for example, arsenious acid or arseniate of sodium or potassium or sulfite of sodium. The said agents are added to the molten glass after the selenium compound has been dissolved therein.

Another method of using the selenium for decoloring the glass is to add it in the form of cullets of glass containing selenium.

It may be preferable in some cases to cause a preliminary decoloring of the molten glass or a simultaneous decoloring of the same by adding other decoloring agents to the molten glass, such, for instance, as metallic nickel or oxid of nickel, saltpeter, or arsenic, and to obtain the higher degree of transparency or whiteness by means of adding selenium.

What I claim as my invention is—

1. The within-described process of decoloring glass which consists in the admixture of selenium with the glass in suitable proportions while the latter is in a molten state.

2. In the process of decoloring molten glass by means of selenium compounds, first dissolving a selenium compound in the molten glass and afterward adding to the molten mass an agent for the setting free of the selenium therein, as herein described.

In testimony that I claim the foregoing as my invention I have signed my name in presence of two subscribing witnesses.

MAX HIRSCH.

Witnesses:
HERNANDO DE SOTO,
CARL HEINRICH KNOOP.